United States Patent Office 2,829,141
Patented Apr. 1, 1958

2,829,141

COPPERABLE DISAZO DYESTUFFS

Werner Bossard, Riehen, near Basel, Switzerland, and Paul Dussy, St-Louis, France, assignors to J. R. Geigy A.-G., Basel, Switzerland, a Swiss firm No Drawing. Application June 4, 1956
Serial No. 589,006

Claims priority, application Switzerland June 20, 1955

8 Claims. (Cl. 260—160)

The present invention concerns metallisable disazo dyestuffs as well as their copper complexes which are distinguished by excellent fastness to light and very good wet fastness properties of their coppered cellulose dyeings. It also concerns processes for the production of these new disazo dyestuffs as well as their use for the production of fast yellow to yellow-brown cellulose dyeings and, as industrial product, the material fast dyed with the aid of these dyestuffs.

In patent application Ser. No. 352,570 (now U. S. Patent No. 2,760,959, issued August 28, 1956), it has been shown that by coupling one mol of an unsulphonated 4.4′-di-acetoacetylamino-diphenyl compound with 2 mols of the same or with one mol of each of two different o-carboxy diazonium compounds of the benzene or naphthalene series—whereby an aryl ureido radical must be present in at least one of the two diazo components—metallisable disazo dyestuffs are obtained, the coppered cellulose dyeings of which have excellent wet fastness properties and are very valuable because of their greenish-yellow shades.

It has now been found that metallisable dyestuffs having excellent light and wet fastness properties are obtained if one mol of an azo component of the general Formula I $$Py_1—Ph_1—X—Ph_2—Py_2 \quad (I)$$

is coupled in any order desired with one mol of a diazonium compound of the general Formula II

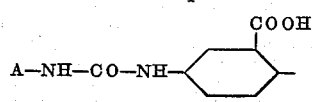

(II)

and with one mol of a diazonium compound of the general Formula III $$R—N=N^\oplus \quad (III)$$

to form a disazo dyestuff of the general Formula IV

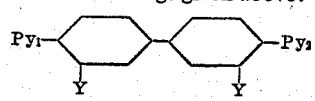

(IV)

In these formulae:

A represents an aromatic radical of the benzene or naphthalene series which contains at least one acid, water solubilising group, $Ph_1$ and $Ph_2$ represent the same or different p-phenylene radicals which may be substituted, $Py_1$ and $Py_2$ represent the same or different radicals of 5-pyrazolones which are linked with Ph in the 1-position and linked in the 4-position to the azo group, X represents the direct linkage or a divalent bridging member containing carbon, and R represents an aromatic radical of the benzene or naphthalene series which contains in the o-position to the azo linkage a group capable of forming the metal complex and which also can represent the grouping

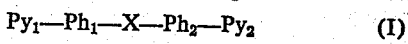

Advantageously such divalent bridging members are used which favour the substantive properties of the end products; thus, for example, the vinyl group, the carbamide and ureido groups, a 4.4′-divinyl diphenyl urea group, a diamide group or an aliphatic, aromatic or heterocyclic, polybasic acid, such as, e. g. fumaric acid, terephthalic acid or cyanuric acid.

The pyrazolone nuclei can be substituted in the 3-position by aryl and preferably alkyl groups such as, e. g. the methyl group; and the p-phenylene radicals represented by the symbols $Ph_1$ and $Ph_2$ can in their turn have, e. g. halogen atoms such as chlorine; alkyl groups such as, e. g. the methyl group; carboxylic acid or sulphonic acid groups, preferably in the meta positions in regard to X.

The following can be named as examples of groups of dipyrazolones usable according to the present invention. Compounds of the general Formulae 1 to 5 wherein $Py_1$ and $Py_2$ have the meanings given above:

(1) 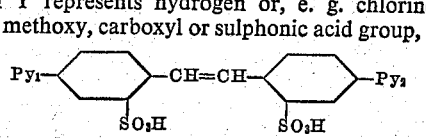

wherein Y represents hydrogen or, e. g. chlorine or a methyl, methoxy, carboxyl or sulphonic acid group, (2) 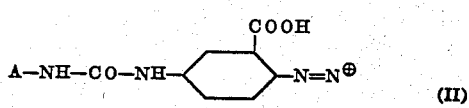

(3) 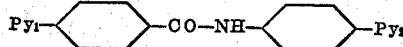

(4) 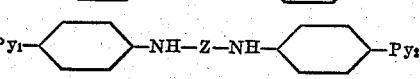

wherein Z represents, e. g. —CO—, the cyanuric acid radical or a divalent radical of a dicarboxylic acid such as fumaric acid or terephthalic acid, (5) 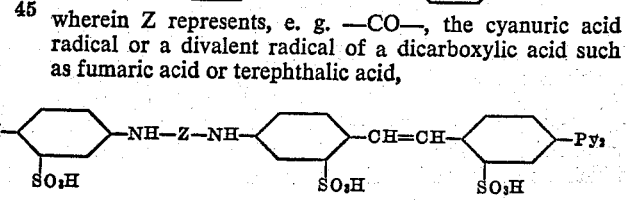

wherein Z has the meaning given above.

Some of such dipyrazolones are already known or can be obtained by known methods from known components, e. g. by combining aminophenyl or aminodisulphonic acid stilbenyl monopyrazolones with dihalides Hal-Z-Hal, wherein Z has the meaning given above, for example with phosgene, fumaric or terephthalic acid dichloride or cyanuric acid chloride, the third halogen atom of the latter advantageously being replaced by a primary or secondary amino group.

The dipyrazolones usable according to the present invention can be asymmetrical or symmetrical both with regard to the two p-phenylene radicals $Ph_1$ and $Ph_2$ or the bridging member. However, it is of advantage to use those in which both the pyrazolone nuclei as well as the p-phenylene radicals are identical such as, e. g. occurs in the 4.4-bis-[3-methyl-5-oxo-pyrazolinyl-(1)]-diphenyl urea or in the 4.4′-bis-[3-methyl-5-oxo-pyrazolinyl-(1)]-stilbene-3.3′-disulphonic acid. Dipyrazolones of the diphenyl series have proved to be particularly advantageous, whereby 4.4'-bis-[3-methyl-5-oxo-pyrazolinyl-(1)]-diphenyl unsubstituted in the diphenyl radical is of particular importance both because of its more easy accessibility as well as with regard to the good properties of the end products obtained therewith.

Diazo components of the general Formula II are already known. Amino compounds of the benzene and naphthalene series which contain at least one acid, water solubilising group of the general formula A—NH₂ can be used to produce them. Examples are: 3- or 4-aminobenzene-1-sulphonic acid or carboxylic acid, 2-methoxy, 2-chloro- or 2-methyl- 5-aminobenzene-1-sulphonic acid, 4-chloro-, or 4- or 6-methyl- 5-aminobenzene-1-sulphonic acid, 3.5-dimethyl-2-aminobenzene-1-sulphonic acid, 5-amino-2-hydroxybenzene-1-carboxylic acid, 5-amino-3-methyl- or 3-sulpho-2-hydroxybenzene-1-carboxylic acid, 1-aminonaphthalene-4- or -5- or -6-sulphonic acid, 1-aminonaphthalene-3.6- or -3.8- or -4.8-disulphonic acid, 2-aminonaphthalene-4.8-, -5.7- or -6.8-disulphonic acid, 2-(4'-aminophenyl)-6-methyl-benzthiazole-5- or -7- sulphonic acid.

The usual diazotised o-hydroxy or o-carboxy amino compounds of the benzene and naphthalene series are usable in the process according to the present invention as diazo components of the general Formula III. For example alkyl sulphonyl-o-aminophenols can be used as o-hydroxyamino compounds, such as 2-amino-4- or -5-methyl sulphonyl- or -ethyl sulphonyl- 1- hydroxybenzene as well as further substituted derivatives thereof, for example nitrated derivatives. Then 2-aminophenol sulphonic acid amides, e. g. 1-hydroxy-2-aminobenzene-4- or -5-sulphonic acid amide, or o-aminophenol sulphonic acids such as 1-hydroxy-2-aminobenzene-4-sulphonic acid, 1-hydroxy-2-aminobenzene-6-sulphonic acid or further substituted derivatives of the latter such as for example 4-nitro- or 4-chloro- 2-amino-1-hydroxybenzene-6-sulphonic acid or 4- or 6-acetylamino- or -benzylamino-2-amino-1-hydroxybenzene-6- or -5-sulphonic acid and also 1.2-diazoxide naphthalene-4-sulphonic acid and 6-nitro-1.2-diazoxide naphthalene-4-sulphonic acid can be used. The following for example can serve as o-aminocarboxy compounds: 2-aminobenzene-1-carboxylic acid, 2-amino-benzene-1.4- or 1.6-dicarboxylic acid, 2-amino-1-carboxy-benzene-4- or -5-sulphonic acid and the corresponding sulphonic acid amides, dialkylamides, ethanolamides etc., 1-aminonaphthalene - 2 - carboxylic acid, 2-aminonaphthalene-3-carboxylic acid and 5 - acylamino - 2 - amino - benzoic acids such as, e. g. the 5-acetylamino-2-amino-benzoic acid. Possibly however, such o-carboxy diazonium compounds are used which also correspond to the general Formula II and in particular those which are identical to the first diazo component and which lead to symmetrical disazo dyestuffs according to the invention which are produced in a simple manner.

The diazonium compounds of the general Formulae II and III are coupled with the dipyrazolones of the general Formula I in aqueous medium, if necessary in the presence of organic bases such as pyridine or homologues thereof.

Disazo dyestuffs according to the invention which contain at least one grouping —NH—Z—NH— can also be produced by reacting an amino monazo dyestuff of the general Formula V

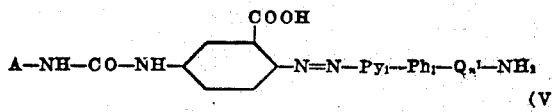

(V)

and an amino monoazo dyestuff of the general Formula VI $$R—N=N—Py_2—Ph_2—Q_n^2—NH_2 \quad (VI)$$

wherein N represents 0 or 1, $Q^1$ and $Q^2$ represents the same or different, possibly substituted p-phenylene or styrylene radicals, and the other symbols have the meanings given under Formula IV above, with one mol of functional acid derivatives corresponding to the radical Z, of which examples have already been given in the passage regarding the production of the dipyrazolones.

The disazo dyestuffs obtained by the above methods are yellow to yellow-brown powders which dissolve well in hot water, possibly with the addition of inorganic salts having an alkaline reaction such as sodium carbonate, sodium phosphates or polyphosphates. They dye cellulose fibres by the usual methods in full yellow to yellow-brown shades.

The dyeings are treated in the dyebath or in a fresh bath with agents giving off copper. As such, for example copper sulphate or copper acetate can be used, the treatment being performed in a neutral to weakly acid medium. It is also possible to use copper compounds which are stable to alkalies such as are obtained, e. g. on reacting copper sulphate with sodium tartrate in a soda-alkaline bath. The shade of the cellulose dyeing is altered to only an inconsiderable extent by these after treatments with agents giving off copper but the wet and light fastness properties are considerably improved.

If desired, the disazo dyestuffs usable according to the present invention can be treated in substance with agents giving off copper. Cellulose fibres dyed with such copper containing dyestuffs are distinguished by their excellent fastness to light.

The following examples illustrate the invention without limiting it in any way. Parts are given as parts by weight and the temperatures are in degrees centigrade. The relationship of parts by weight to parts by volume is as that of kilogrammes to litres.

*Example 1*

70.2 parts of 4-aminodiphenyl urea-3-carboxylic acid-4'-sulphonic acid are dissolved in 700 parts of water with 16 parts of caustic soda, the solution is mixed with 13.8 parts of sodium nitrite and diazotised by the quick addition of 72 parts of concentrated hydrochloric acid at 5–10° C. 12 parts of sodium bicarbonate are sprinkled into the lemon yellow suspension of the diazonium compound and a 20–25° warm solution consisting of 34.6 parts of 1.1'-(4".4"'-diphenylene)-di-[3-methyl-pyrazolone-(5)], 500 parts of water, 8.4 parts of sodium hydroxide and 20 parts of sodium carbonate is added within one hour. After 3 to 4 hours, the dyestuff suspension is warmed to 60–65°, 2.5% of sodium chloride, calculated on the volume obtained, are added and the dyestuff of the formula:

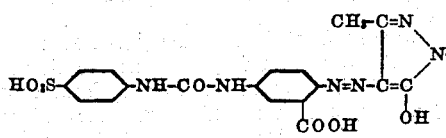 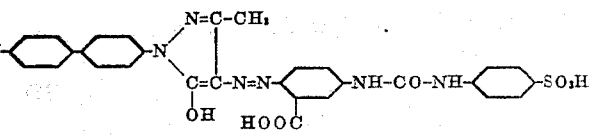

is filtered off. The dried dyestuff is a yellow-brown powder which dissolves in water and in concentrated sulphuric acid with a yellow colour. It has good drawing power onto cellulose fibres which, when after coppered, are dyed in pure yellow shades which have excellent fastness to light and good wet fastness properties.

If instead of 70.2 parts of 4-aminodiphenyl urea-3-carboxylic acid-4'-sulphonic acid, the same number of parts of 4-aminodiphenyl urea-3-carboxylic acid-3'-sulphonic acid, 86.2 parts of 4-aminodiphenyl urea-3-carboxylic acid-2'.5'-disulphonic acid, 73.0 parts of 2'- or 4'-methyl-4-aminodiphenyl urea-3-carboxylic acid-3'-sulphonic acid, 77.1 parts of 2'- or 4'-chloro-4-aminodiphenyl urea-3-carboxylic acid-3'-sulphonic acid, 75.8 parts of 2'.4'-dimethyl-4-aminodiphenyl urea-3-carboxylic acid-6'-sulphonic acid, 82.2 parts of 4-amino-4'-hydroxydiphenyl urea-3.3'-dicarboxylic acid-5'-sulphonic acid, 66.2 parts of 4-amino-4'-hydroxydiphenyl urea-3.3'-dicarboxylic acid, 62.0 parts of 4-aminodiphenyl urea-3.3'- or -3.4'-dicarboxylic acid, 80.2 parts of 4-aminophenyl-1.1'-naphthyl urea-3-carboxylic acid-4'-sulphonic acid, 96.2 parts of 4-aminophenyl-1.1'-naphthyl urea-3-carboxylic acid-3'.8'-disulphonic acid or 96.2 parts of 4-aminophenyl-1.2'-naphthyl urea-3-carboxylic acid-4'.8'- or -6'.8'-disulphonic acid are used, then dyestuffs with similar full, yellow shades and properties are obtained.

acid-3'-sulphonic acid and neutralised with sodium carbonate is poured into this solution within one hour. The coupling is complete after 3–4 hours. The diasazo dyestuff formed is salted out with 2.5% of sodium chloride, calculated on the volume obtained, filtered off, washed with diluted sodium chloride solution and dried.

It is a yellow-brown powder which dissolves in hot water with the addition of sodium carbonate with an orange colour and in concentrated sulphuric acid with a yellow-brown colour. The after-coppered dyeings on cellulose fibres are reddish-yellow and have excellent fastness to light.

In the free form, the dyestuff corresponds to the formula:

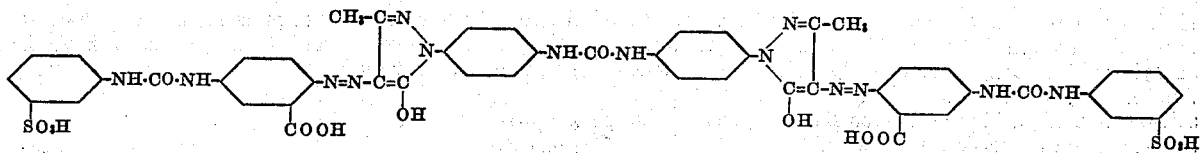

Example 2

A. 40.4 parts of the dipyrazolone of the formula:

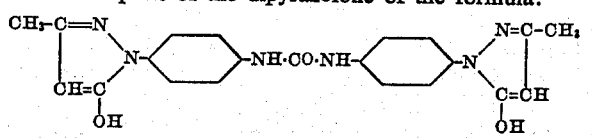

are dissolved in 500 parts of water with 8 parts of sodium hydroxide and 40 parts of sodium carbonate are added. A diazonium salt dispersion produced by known methods from 70.2 parts of 4-aminodiphenyl urea-3-carboxylic In the above example, if instead of 40.4 parts of the dipyrazolone of the formula:

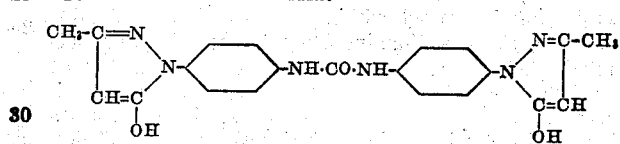

the corresponding number of parts of one of the dipyrazolones given below are used, then similar dyestuffs with the same properties are obtained.

45.8 parts

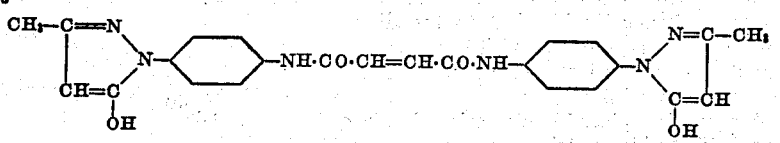

50.8 parts

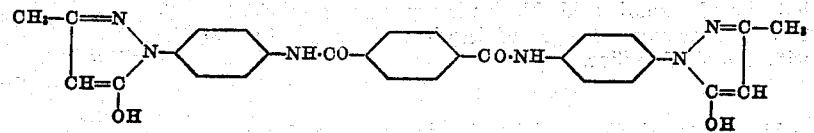

54.5 parts

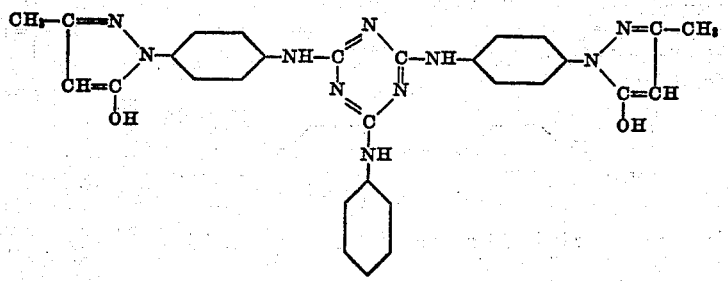

92.8 parts

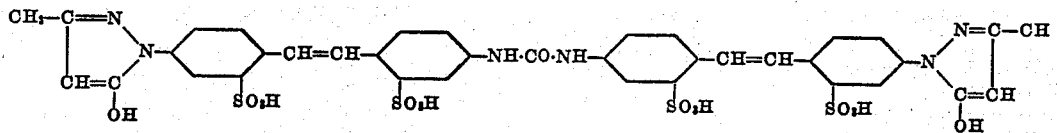

98.2 parts

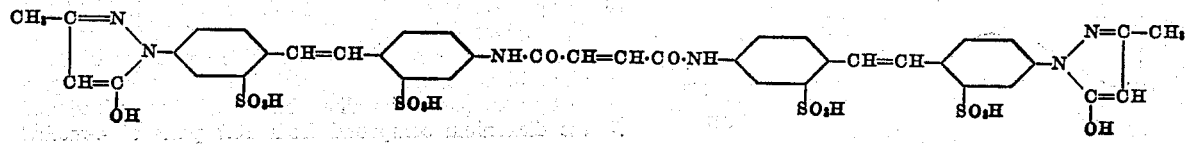

103.3 parts

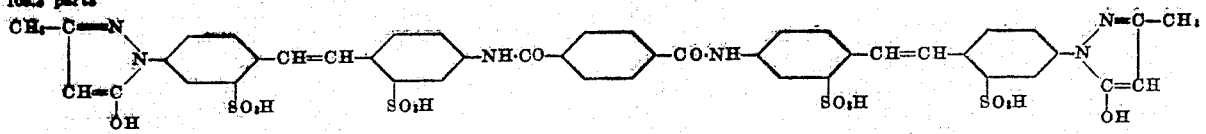

107.0 parts

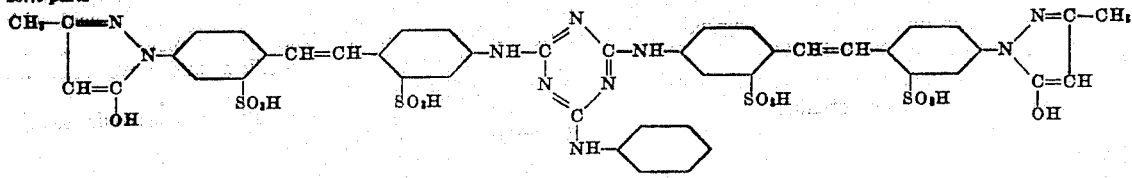

If, in the above example and its variations with regard to the dipyrazolones, instead of 70.2 parts of 4-aminodiphenyl urea-3-carboxylic acid-3'-sulphonic acid the same number of parts of 4-aminodiphenyl urea-3-carboxylic acid-4'-sulphonic acid is used, then similar dyestuffs with the same good properties are obtained.

B. 35.1 parts of 4-aminodiphenyl urea-3-carboxylic acid-3'-sulphonic acid are diazotised as described in Example 1 and neutralised with sodium bicarbonate. This suspension is poured within one hour into a solution of 18.9 parts of 1-(4'-aminophenyl)-3-methyl pyrazolone-(5) in 250 parts of water, 4 parts of sodium hydroxide and 20 parts of sodium carbonate. The coupling is complete after 3 hours. The monoazo dyestuff formed is precipitated with sodium chloride, filtered off and then again dissolved in 1000 parts of 40–45° warm water. Phosgene is slowly introduced into this solution while keeping the pH value constant at 7.5–8.0. As soon as no more free amino group can be traced, the azo dyestuff formed is precipitated with sodium chloride, filtered off, washed with diluted sodium chloride solution and dried.

It is chemically identical to the disazo dyestuff described in paragraph A and it has the same shade as well as the same excellent fastness properties.

Dyestuffs with similar properties are obtained if the phosgene is replaced by fumaric acid dichloride, fumaric acid dibromide, maleic acid, mesaconic acid, chloro- or bromo-fumaric acid or terephthalic acid dichloride, or if 1 mol of cyanuric acid chloride is condensed first with 2 mols of the monoazo dyestuff described above and then with 1 mol of aniline.

Example 3

73.0 parts of 4'-methyl-4-aminodiphenyl urea-3-carboxylic acid-3'-sulphonic acid are diazotised in the usual way and then neutralised with sodium carbonate whereupon 60 parts of sodium bicarbonate are added. An alkaline solution of 53.2 parts of the dipyrazolone of the formula:

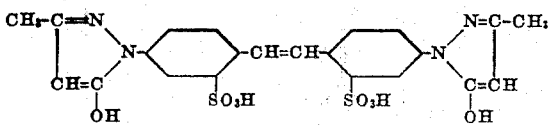

is poured in within 30 minutes. After the coupling is complete, the disazo dyestuff formed is separated at 70–80° with sodium chloride, filtered off and dried. It is a yellow-brown powder which dissolves in water with a yellow and in concentrated sulphuric acid with a brown colour. It dyes cotton, staple fibres, viscose, hemp or jute fibres, when after-coppered, in full yellow shades which have very good fastness properties.

If in this example instead of the 53.2 parts of the dipyrazolone of the formula:

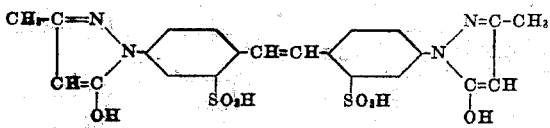

the corresponding number of parts of one of the dipyrazolones listed below are used, then dyestuffs with similar properties are obtained.

40.4 parts

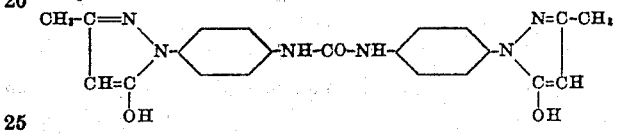

41.5 parts

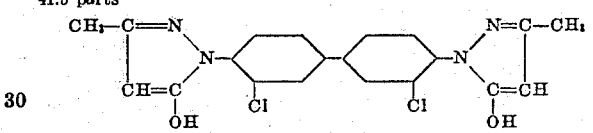

37.4 parts

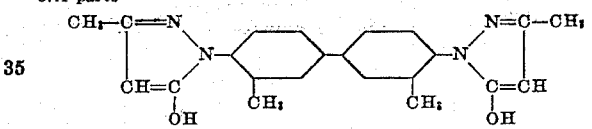

43.4 parts

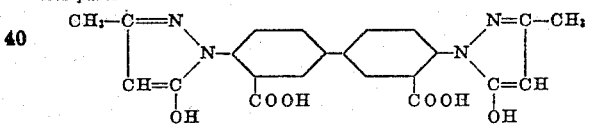

40.6 parts

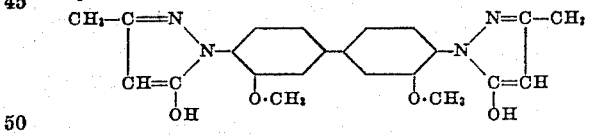

38.9 parts

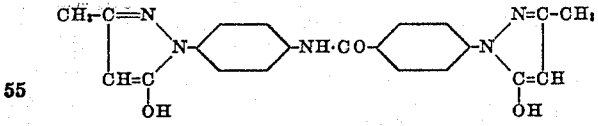

If, in the above example and its variations with regard to the dipyrazolone, instead of 73.0 parts of 4'-methyl-4-aminodiphenyl urea-3-carboxylic acid-3'-sulphonic acid, 70.2 parts of 4-aminodiphenyl urea-3-carboxylic acid-4'-sulphonic acid are used, then similar dyestuffs with the same good properties are obtained.

Example 4

35.1 parts of 4-amino-3-carboxydiphenyl urea-3-carboxylic acid-4'-sulphonic acid are diazotised as described in Example 1. The lemon yellow suspension of the diazonium compound is poured within 1 hour into a 20–25° warm solution consisting of 34.6 parts of 1.1'-(4'''.4'''-diphenylene)-di-[3-methyl-pyrazolone-(5)], 500 parts of water, 8.4 parts of sodium hydroxide and 20 parts of sodium bicarbonate. On completion of the coupling, a further 20 parts of sodium bicarbonate are added and the diazonium compound from 18.7 parts of 4-methyl sulphonyl-2-amino-1-hydroxybenzene is poured in within 1 hour. The dyestuff formed of the formula:

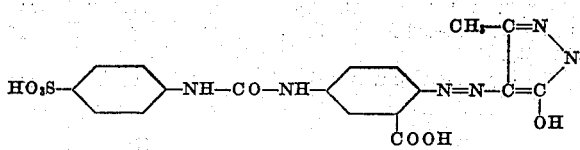 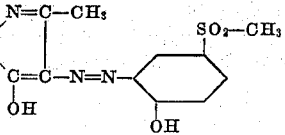

is separated in the warm with sodium chloride, filtered off and dried. It is a yellow-brown powder which dissolves in water and in concentrated sulphuric acid with a yellow colour. It dyes cotton, staple fibres, viscose, hemp and jute fibres, when after-coppered, in yellow shades which have excellent fastness properties.

If in the above example the 18.7 parts of 4-methyl sulphonyl-2-amino-1-hydroxybenzene are replaced by the number of parts of a diazo component given in the following table, then dyestuffs having the properties given are obtained.

If, instead of the 70.2 parts of 4-aminodiphenyl urea-3-carboxylic acid 4'-sulphonic acid, 86.2 parts of 4-aminodiphenyl urea - 3 - carboxylic acid-2'.5'-disulphonic acid, 73.0 parts of 2'- or 4'-methyl-4-amino-diphenyl urea-3-carboxylic acid-3'-sulphonic acid, 80.2 parts of 4-aminophenyl-1.1'-naphthyl urea-3-carboxylic acid-4'-sulphonic acid or 96.2 parts of 4-aminophenyl-1.1'-naphthyl urea-3-carboxylic acid-3'.8'-disulphonic acid are used, then similar dyestuffs with the same properties are obtained.

*Example 6*

2 parts of the dyestuff obtained according to Example

| Dyestuff No | Number of parts | Diazo component coupled with the monoazo dyestuff from 35.1 parts of 4-amino-3-carboxydiphenyl urea-4'-sulphonic acid and 34.6 parts of 1.1'-(4'',4'''-diphenylene)-di-[3-methyl-pyrazolone-(5)] | Resulting dyestuff: P=color of powder, S=shade of dyeing after treated with copper salts. |
|---|---|---|---|
| 1 | 18.7 | 5-methyl sulphonyl-2-amino-1-hydroxybenzene | P=orange; S=reddish yellow. |
| 2 | 20.1 | 4-ethyl sulphonyl-2-amino-1-hydroxybenzene | Do. |
| 3 | 20.1 | 5-ethyl sulphonyl-2-amino-1-hydroxybenzene | Do. |
| 4 | 18.9 | 1-hydroxy-2-aminobenzene-4-sulphonic acid | P=yellow; S=greenish yellow. |
| 5 | 18.9 | 1-hydroxy-2-aminobenzene-6-sulphonic acid | Do. |
| 6 | 22.4 | 4-chloro-2-amino-1-hydroxybenzene-6-sulphonic acid. | P=brown; S=yellowish orange. |
| 7 | 23.4 | 4-nitro-2-amino-1-hydroxybenzene-6-sulphonic acid. | Do. |
| 8 | 25.0 | 1.2-diazoxide-naphthalene-4-sulphonic acid | P=red-brown; S=orange. |
| 9 | 29.5 | 6-nitro-1.2-diazoxide-naphthalene-4-sulphonic acid. | Do. |
| 10 | 13.7 | 2-amino-1-carboxybenzene | P=yellow-brown; S=greenish yellow. |
| 11 | 21.6 | 2-amino-1-carboxybenzene-4-sulphonamide | P=yellow-brown; S=yellow. |
| 12 | 21.6 | 2-amino-1-carboxybenzene-5-sulphonamide | Do. |
| 13 | 19.4 | 5-acetylamino-2-amino-1-carboxybenzene | P=yellow-brown; S=greenish yellow. |
| 14 | 18.7 | 2-aminonaphthalene-3-carboxylic acid | P=brown; S=orange. |

*Example 5*

70.2 parts of 4-aminodiphenylurea-3-carboxylic acid-4'-sulphonic acid are diazotised as described in Example 1, neutralised with sodium carbonate and then 60 parts of sodium bircarbonate are added. An alkaline solution of 53.2 parts of the dipyrazolone of the formula:

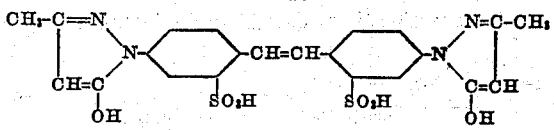

is added within 30 minutes.

On completion of the coupling, the dyestuff formed is separated with sodium chloride at 70–80°, filtered off and again dissolved in 2500 parts of water at 80–85°. 400 parts of a copper oxide-ammonia solution, which contains 50 parts of crystallised copper suplate and 120 parts of concentrated aqueous ammonia, are added and the whole is stirred for some time at this temperature. The copper complex formed is precipitated with sodium chloride, filtered off and dried. It is a yellow-brown powder which dissolves in water and in concentrated sulphuric acid with a yellow colour and which draws very well onto natural and regenerated cellulose fibers. The reddish yellow dyeings have excellent fastness to light and in addition have good wet fastness properties.

5 are dissolved in 3000 parts of water and 2 parts of sodium carbonate. 100 parts of cotton are entered into this dyebath at 40–45°, the bath is farmed within 30 minutes to 90–95°, 30 parts of sodium sulphate are added and dyeing is performed for another 45 minutes at this temperature. After this time, the dyed goods are rinsed cold in the usual way and dried. The cotton is dyed in reddish-yellow shades which have very good fastness to light and good wet fastness properties.

*Example 7*

2 parts of the dyestuff obtained according to Example 1 are dissolved in a dyebath containing 3000 parts of water and parts of sodium carbonate. 100 parts of cotton are entered at 40–50°, the bath is warmed within 30 minutes to 90–95°, 30 parts of sodium sulphate are added and dyeing is performed for 45 minutes at this temperature. After this time, the dyed goods are rinsed cold and after-treated in a fresh bath with 2 parts of crystallised copper sulphate in 2000 parts of water and 2 parts of 30% acetic acid. The after-treatment is performed at 70° for 30 minutes. The goods are rinsed and dried in the usual way. The pure yellow cotton dyeing has excellent fastness properties.

What we claim is:

1. A copperable disazo dyestuff corresponding to the general formula:

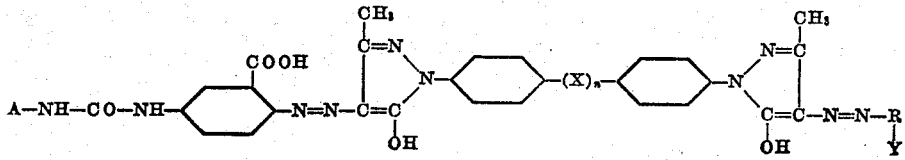

wherein A represents an aromatic radical containing at least one six-membered carbocyclic nucleus and at most two such nuclei condensed with one another and which contains an acid water solubilising group, X represents a carbon containing bridging member, $n$ is one of the integers 0 and 1, R represents an aromatic radical selected from the group consisting of radicals of the benzene and naphthalene series, Y represents a metallisable group in o-position to the azo group selected from the group consisting of OH and COOH.

2. A copperable disazo dyestuff corresponding to the general formula:

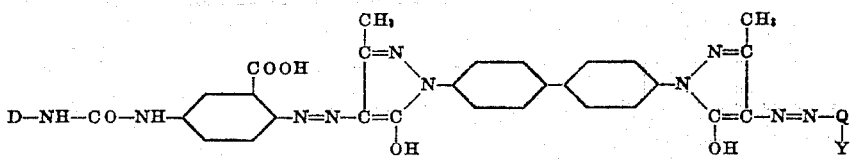

wherein D represents a sulphophenyl radical, Q represents a mononuclear radical of the benzene series, and Y represents a metallisable group in o-position to the azo group selected from the group consisting of OH and COOH.

3. A copperable disazo dyestuff of the general formula:

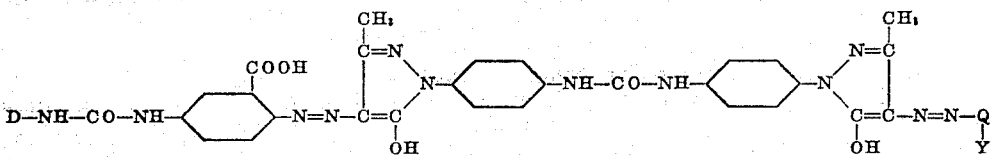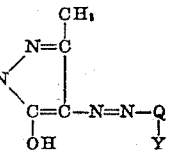

wherein D represents a sulphophenyl radical, Q represents a mononuclear radical of the benzene series and Y represents a metallizable group in o-position to the azo group selected from the group consisting of OH and COOH.

4. A copperable disazo dyestuff of the formula:

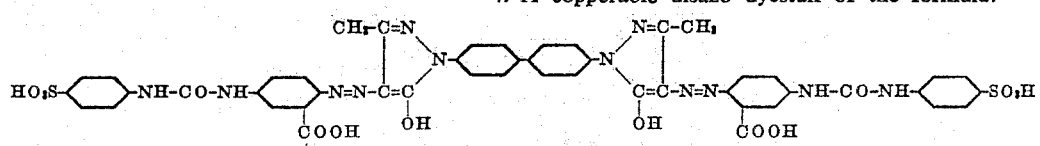

5. A copperable disazo dyestuff of the formula:

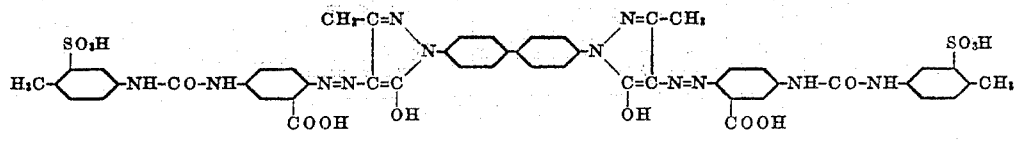

6. A copperable disazo dyestuff of the formula:

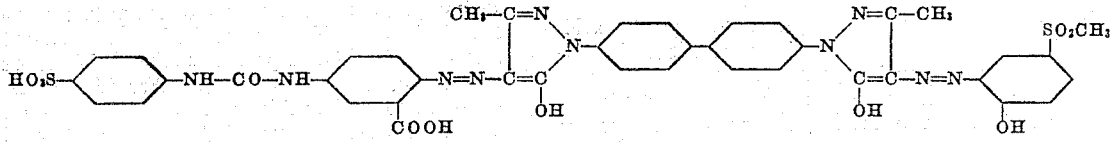

7. A copperable disazo dyestuff of the formula:

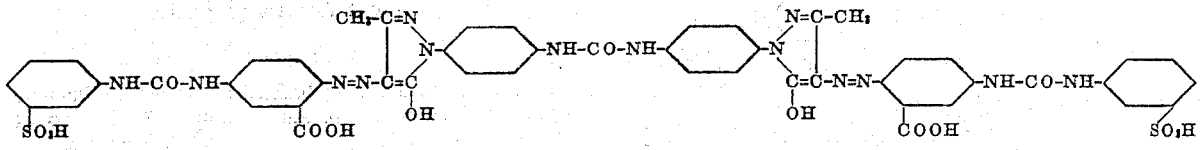

8. A copperable disazo dyestuff of the formula:

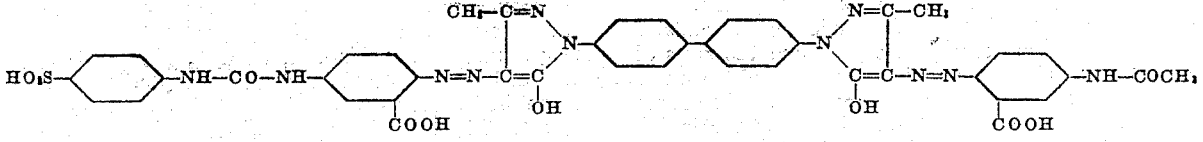

References Cited in the file of this patent
UNITED STATES PATENTS

Re. 23,380    Widmer _____ June 12, 1951
2,760,959    Bossard et al _____ Aug. 28, 1956